United States Patent [19]
Kurihashi et al.

[11] Patent Number: 4,757,221
[45] Date of Patent: Jul. 12, 1988

[54] ALTERNATOR FOR AUTOMOBILE

[75] Inventors: Yasutaka Kurihashi, Mito; Kenziro Kai, Katsuta, both of Japan

[73] Assignee: Hitachi, Ltd., Tokyo, Japan

[21] Appl. No.: 26,123

[22] Filed: Mar. 16, 1987

[30] Foreign Application Priority Data

Mar. 20, 1986 [JP] Japan .................... 61-62821

[51] Int. Cl.[4] ............................ H02K 9/06
[52] U.S. Cl. ........................ 310/62; 310/43; 310/58; 310/63; 310/68 D; 310/89
[58] Field of Search .............. 310/62, 63, 68 D, 58, 310/59, 89, 263, 42, 43, 64, 65, 60 R, 60 A

[56] References Cited

U.S. PATENT DOCUMENTS

| | | | |
|---|---|---|---|
| 4,418,295 | 11/1983 | Shiga | 310/263 |
| 4,488,070 | 12/1984 | Iwaki | 310/62 |
| 4,492,885 | 1/1985 | Kitamura | 310/63 |
| 4,588,911 | 5/1986 | Gold | 310/43 |
| 4,617,485 | 10/1986 | Nakamura | 310/263 |
| 4,659,950 | 4/1987 | Gotoh | 310/89 |

FOREIGN PATENT DOCUMENTS 3314948 11/1983 Fed. Rep. of Germany ........ 310/63
148640 9/1983 Japan .

Primary Examiner—R. Skudy
Attorney, Agent, or Firm—Antonelli, Terry & Wands

[57] ABSTRACT

An alternator for use in an automobile which includes two cooling fans, rear and front, rotatable with the rotor shaft disposed on opposed sides of the rotor, which cooling fans are received in front and rear brackets, respectively. The brackets have inlet ports and outlet ports through which drafts of cooling air are to be drawn in and out of the inner cavity of the alternator through rotation of the fans, attaining cooling of necessary parts e.g. a stator winding, rotor exciting winding, rectifier diode, etc. It is uniquely designed that the one fan on the front side has a suction capacity greater than that of the other fan on the rear side, causing a negative pressure differential between the two suction sections of cooling fans. This results in an additional axial flow of cooling air directed from the rear to the front which contributes to improvement of cooling efficiency for the rectifier diode and rotor exciting winding. Thus the alternator can advantageously be made in compact size yet have a higher output.

2 Claims, 2 Drawing Sheets

ALTERNATOR FOR AUTOMOBILE

BACKGROUND OF THE INVENTION

1. FIELD OF THE INVENTION

The present invention relates to an alternator for automobiles, and more particularly to a cooling device for cooling the stator winding, rectifier diode, etc. incorporated in the alternator.

2. DESCRIPTION OF THE RELATED ART

In the heretofore alternator for automobiles, it has been common in design that to achieve reduction in size or compactness and a higher output, the alternator incorporates in it a cooling device for cooling necessary parts such as the stator winding, rectifier diode, etc. In the cooling device of the kind specified above, as typically disclosed in, for example, Japanese Unexamined patent publication No. 148640/83, it is usually constructed that there are provided cooling fans on opposed sides of the rotor, one of which cooling fans being adapted to draw cooling air from outside into the alternator through the front bracket so as to cool the stator winding while the other being adapted to effect the same through the rear bracket so as to cool the rectifier diode mounted within the rear bracket and the stator winding as well.

With the conventional cooling device, in this concern, it has been common in design that either both of the two cooling fans have the same level of fan capacity (suction capacity), or the cooling fan on the front bracket side be selected as of a suction capacity smaller than that of the other cooling fan on the rear bracket side because the space available in the front bracket being rather restricted with a view to reduce the whole length of the alternator assembly. Under these design requirements, however, the situation may result that the negative pressure occurring in the suction sections of the respective cooling fans in the brackets side will surpass that in the front bracket. In consequence, the rectifier diode mounted on the rear bracket side is cooled virtually solely by the cooling air draft provided by the cooling fan on the rear bracket side (hereinafter shortly referred to as "diode-side fan").

Furthermore, it is difficult, in the case of the cooling fans being equal in capacity, to attain desired cooling of the exciting winding on the rotor because there will be no occurrence of cooling air draft (in an axial flow) flowing through the space in which the rotor is disposed. Still further, in cases where the diode-side fan is of a capacity greater than that of the cooling fan on the front bracket side (hereinafter shortly referred to as "opp. diode-side fan"), the diode-side fan develops in its suction section a greater negative pressure. As a result of this negative pressure differential, part of the cooling air draft through the opp. diode-side fan will flow toward the diode-side fan in the form of an axial flow. Since, however, the axial flow occuring in this occasion is directed aganist the flow of cooling air draft provided by the diode-side fan, there will be a reduction in the effective volume of cooling air that can be contributory to the cooling of the rectifier diode, hence resulting in lowering of the efficiency of cooling the diode.

SUMMARY OF THE INVENTION

The present invention has been devised in view of the foregoing and thus has an object to provide an alternator for automobiles which is capable of attaining efficient cooling of necessary parts such as the stator winding, exciting winding of the rotor, rectifier diode, etc. disposed within the alternator, and which can be designed in a compact fashion and with an increased output.

To achieve the above object, according to the invention, there is provided an alternator comprising cooling fans respectively disposed on opposite sides of the alternator rotor, a couple of brackets accomodating the cooling fans therein, and an inlet port and an outlet port for feeding the cooling air draft in and out of the alternator assembly, wherein the above cooling fans are arranged such that as compared with the one fan mounted on the rear bracket side where the rectifier diode is disposed, the other fan or the opp. diode-side fan is selected as greater in suction capacity, therefore, the level of negative pressure occurring in a suction section of the other or op. diode-side fan be higher than that of the one or diode-side fan.

With the invention constructed as above, wherein the opp. diode-side fan displays a negative pressure greater than that of the diode-side fan, there will occur a negative pressure differential between the suction sections of the two fans, which causes an axial flow of cooling air draft through the inner cavity space in which the rotor is disposed in a direction from the diode-side fan to the opp. diode-side fan for compensating the negative pressure differential. This cooling air draft in the form of an axial flow is replenished from outside through the inlet port provided on the bracket for the diode-side fan.

Accordingly, it will be appreciated that there can be provided a resultant flow volume of cooling air draft applied to the side of the diode carrying bracket which is the original flow provided by the diode-side fan plus the above-mentioned supplemental flow of cooling air draft. The diode carrying bracket thus is subjected to a flow of cooling air draft increased by the supplemental flow thereby making it possible to improve the efficiency of cooling the rectifier diode. Since, further, there is provided the above-described supplemental cooling air draft in the form of an axial flow through the inner cavity where the rotor exciting winding is disposed, cooling is equally effectuated to the rotor exciting winding. Further, the stator winding is intended to be cooled by cooling air draft produced by both the diode-side fan and the opp. diode-side fan. The advantageous occurrence of supplemental cooling air draft described above, assures as increase in the entire flow of cooling air draft, enabling significant improvements of the cooling effect on the stator winding as compared with the same attained by the heretofore alternator of conventional design.

BRIEF DESCRIPTION OF THE DRAWINGS

The invention will now be described in further detail of its preferred embodiment in conjunction with the accompanying drawings in which.

DETAILED DESCRIPTION OF PREFERRED EMBODIMENTS

Figure 1:
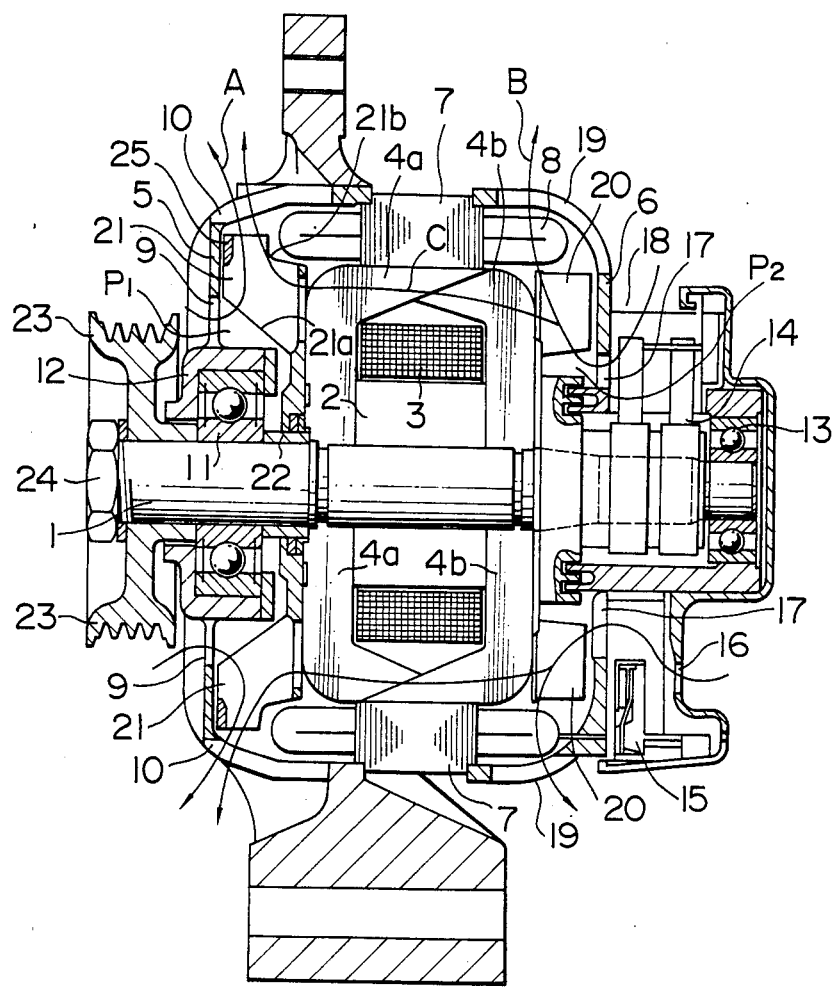
FIG. 1 is a longitudinal sectional view of an alternator for automobiles constructed according to an embodiment of the invention.

In FIG. 1, the reference numeral 1 indicates a rotating shaft of the alternator, and 2 indicates a rotor secured on the shaft, including an exciting winding 3 and a pair of pole cores 4a and 4b of pawl shape. The pole cores 4a and 4b are disposed in plural numbers circumferentially about the rotating shaft, intermeshing with one another with gaps maintained therebetween. The reference numeral 5 indicates a front bracket and 6 a rear bracket. Between the front bracket 5 and the rear bracket 6 is fittingly clamped a stator 7 with a winding 8.

The front bracket 5 is fittingly clamped a stator 7 with a winding 8.

The front bracket 5 is provided at its side wall (lateral) portion with a cooling air inlet port 9 while a cooling air outlet port 10 is provided adjacent the stator winding 8 near the upper portion of the front bracket 5. The front bracket, also, is provided in the middle of its side wall portion with a bearing container 12 receiving a front bearing 11. On the other hand, the rear bracket 6 accomodates in its backward portion a rear bearing 13, a brush 14, a rectifier diode 15, etc. The rear bracket, also, is provided in its backward portion with cooling air inlet ports 16, 17 and 18 for introducing cooling air draft from behind the bracket into the alternator, while a cooling air outlet port 19 is provided adjacent the stator winding 8.

Figure 2:
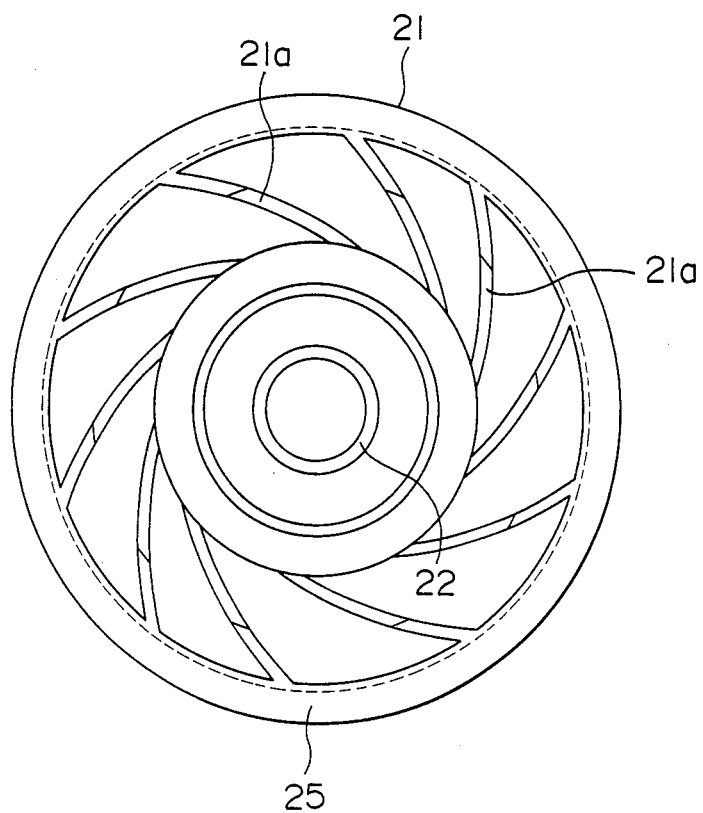
FIG. 2 is a front view of one example of a cooling fan to be incorporated in the FIG. 1 embodiment.

The reference numerals 20 and 21 are centrifugal fans for cooling provided on opposed side surfaces of the rotor 2, of which the centrifugal fan 20 on the rear bracket side 6 is fabricated by a sheet metal bending process and secured to the outer surface of the rear pole core 4b. The centrifugal fan 20 may be formed by molding from synthetic resins. On the other hand, the centrifugal fan 21 on the front bracket side is formed by molding from synthetic resins, for example, glass mixed 6,6-nylon, and is provided around its center with an integral fan bushing 22. It is arranged such that with the fan bushing 22 fitted onto the rotating shaft 1, the centrifugal fan 21 can be urged into close contact with the side surface of the front pole core 4a of the rotor 2 by tightening a fastening nut 24 for a pulley 23. The centrifugal fan 21 may be formed by a sheet metal bending process. This centrifugal fan 21 is designed such that the outer diameter of the fan is selected as greater than that of the centrifugal fan on the rear bracket side, whereby the fan 21 having a suction capacity greater than that of the fan 20 on the rear bracket side. Although a radial fan or sirocco fan can be used as the centrifugal fan 21, preferably a turbofan preferably which can provide the largest air flow among a number of fan types under a given fan diameter is selected. Further, it is also designed such that the outer diameter of the fan is selected as greater than that of the centrifugal fan on the rear bracket side, whereby the fan 21 having a suction capacity greater than that of the fan 20 of the rear bracket side. Furthermore, it is arranged that each blade of the opposite diode-side fan 21 has its inner inclination 21a of an increased gradient so as to avoid undesirable physical constant against the bearing container 12 confronting the fan while each fan blade being formed on its backward surface with a cutout section 21b to prevent possible physical interference between the blade and the stator winding 8. The opposite diode-side fan 21 also is provided on its front face with an annular reinforcement 25 which joins the outermost edges of the blades integrally for enhancement of the strength of the fan, as shown in FIG. 2.

Next, the alternator embodied as above according to the invention will be described of its cooling operation.

When the rotor 2 is driven by rotation of the associated engine, the centrifugal fans 20 and 21 rotate in synchronization with the rotation of the rotor 2, which causes the cooling air draft from outside to be drawn in the alternator assembly through the inlet ports 16, 17 and 18 on the rear bracket 6 side, and through the inlet port 9 on the front bracket 5 side. The cooling air draft thus drawn passes through the inner space defined by the two brackets 5 and 6 and then is exhaused externally through the outlet ports 10 and 19. In this instance, the opposite diode-side fan 21 provides a negative pressure P1 around its suction section which is greater than that P2 provided by the diode-side fan 20 because the fan 21 has been selected as of a capacity greater than that of the fan 20, hence a negative pressure differential P1 - P2 occurring. To compensate this negative pressure differential, there occurs an axial flow C directed from the rear bracket 6 side to the front bracket 5 side. It is arranged that this cooling air draft in the form of an annular axial flow C is drawn inwardly through the inlet ports 16, 17 and 18, and together with a cooling air draft B which has inherently been drawn by rotation of the centrifugal diode-side fan 20, flows inwardly of the rear bracket 6 being increased i volume serves to cool the rectifier diode 15. Subsequently, the cooling drafts B and C diverge from each other in such manner that the cooling draft B flows out through the outlet poret 19 after having cooled the stator winding 8, whereas the cooling draft C passes through and between the pole corrs 4a and 4b of the rotor 2 in the form of an axial flow while cooling the rotor exciting winding 3. On the other hand, the cooling draft A on the front bracket side 5 is drawn in the bracket 5 through the inlet port 9 and joins the draft C, the resulting cooling draft of which flows out through the outlet port 10 while cooling the stator winding 8.

According to this embodiment of the invention, therefore, it is made possible to provide an improved efficiency of cooling the rectifier diode 15 through an increase in the flow of draft on the rear bracket side 6 and hence to sufficiently restrain temperature rises caused by heating of the diode.

Moreover, the cooling of the stator winding 8 can be effected with a totally increased flow of cooling draft while the rotor exciting winding 3 can be lowered of its resistance otherwise incremental with its heating, by virtue of the cooling draft C which cools the rotor exciting winding 3. Thus, it is also made possible to improve the output of the alternator to a far greater extent than with the conventional alternator.

Yet further, according to this embodiment of the invention, even in case where the opposite diode-side fan 21 is designed of enlarged fan configuration, the fan blade is prevented from undesirable physical contact with the bearing container 12 by virtue of its inner inclination 21a with a greater gracient. The backward inner inclination 21a of the blade being disposed so as not to interfere with the stator winding 8 makes it possible to accomodate the opposite diode-side fan 21 within the narrow space available in the front bracket 5 without resort to provision of extra space fo installation. Hence, the invention can achieve a higher output for an alternator of the type specified while maintaining compactness in its size.

As apparent from the foregoing, the invention can provide an alternator for automobiles which can achieve compactness in size and increase its output by improving the cooling efficiency of parts such as the stator winding, rotor exciting winding, rectifier diode, etc. to be incorporated in the alternator.

What is claimed is:

1. An alternator for an automobile comprising:
   a rotor;
   a first cooling fan mounted on one side of said rotor;
   a second cooling fan mounted on the other side of said rotor and including an outer annular reinforcement which joins outermost edges of blades of said second cooling fan, said second cooling fan having a greater suction capacity than said first cooling fan thereby maintaining a negative pressure in a suction area of said second cooling fan;
   a first bracket for receiving therein said first cooling fan;
   a secon bracket for receiving therein said second cooling fan and having an upper portion and a lateral portion, said upper portion being near said outer annular reinforcement of said second cooling fan;
   a rectifier diode mounted within said first bracket;
   an inlet port and an outlet port respectively defined in said first bracket for ventilating cooling air;
   an inlet port and an outlet port respectively defined in said second bracket for ventilating cooling air, said inlet port defined in said second bracket being disposed at said lateral portion of said second bracket, said outlet port defined in said second bracket being disposed near said upper portion of said second bracket and adjacent to said outer annular reinforcement of said second cooling fan so as to allow air to flow from at least said inlet port defined in said first bracket to said outlet port defined in said second bracket.

2. An alternator for an automobile according to claim 1, wherein said first cooling fan is made of resin.

* * * * *